July 6, 1965 W. E. SIMAS 3,193,150
PORTABLE DUMPING BIN
Filed Aug. 1, 1962 3 Sheets-Sheet 2
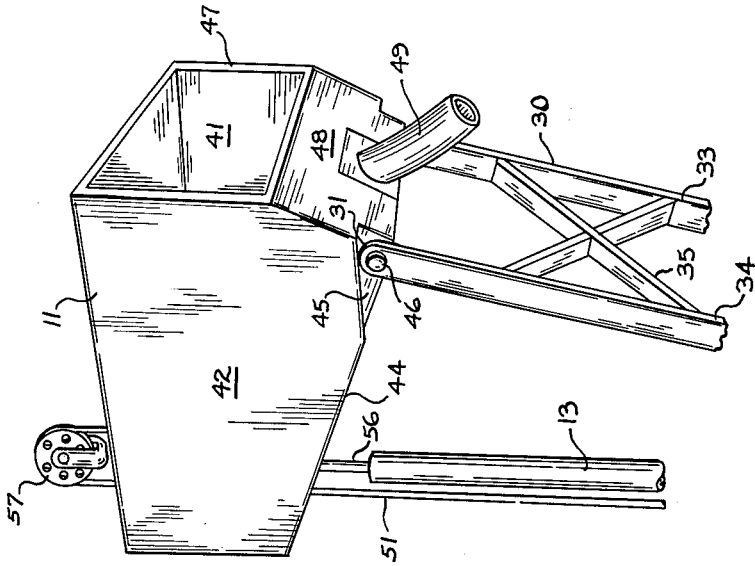
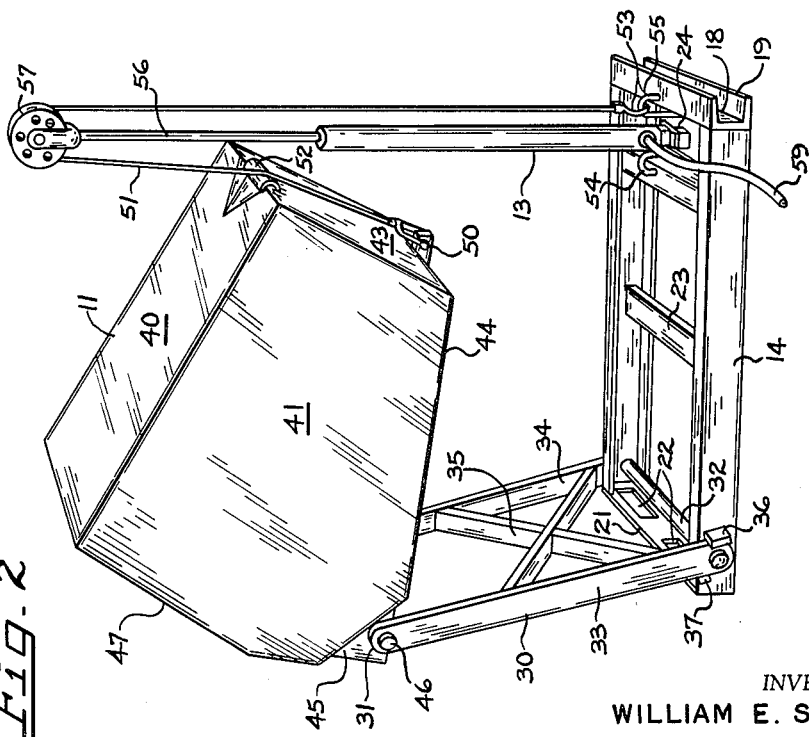
INVENTOR.
WILLIAM E. SIMAS
ATTORNEY

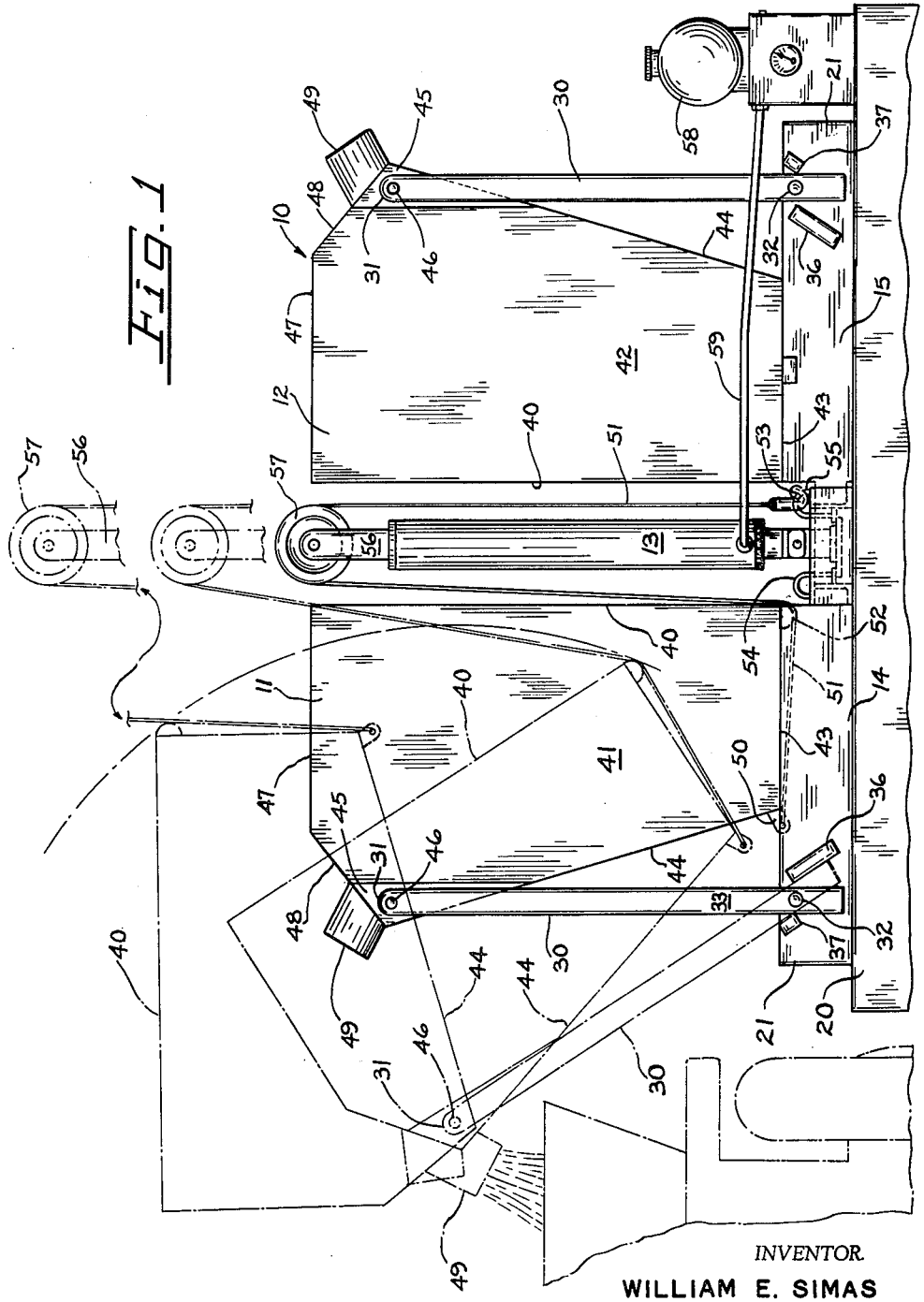

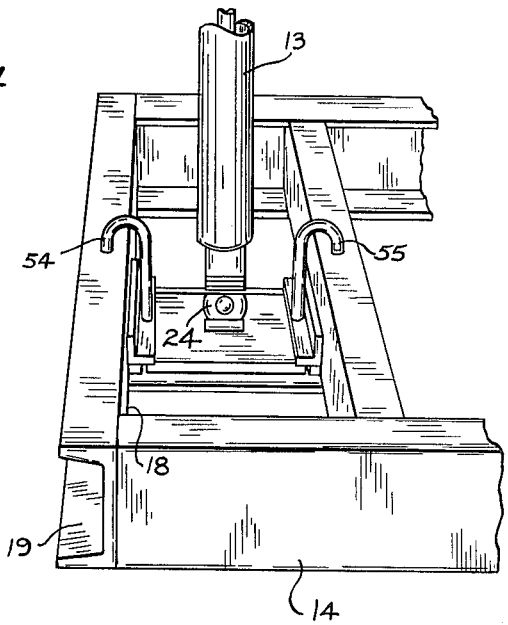
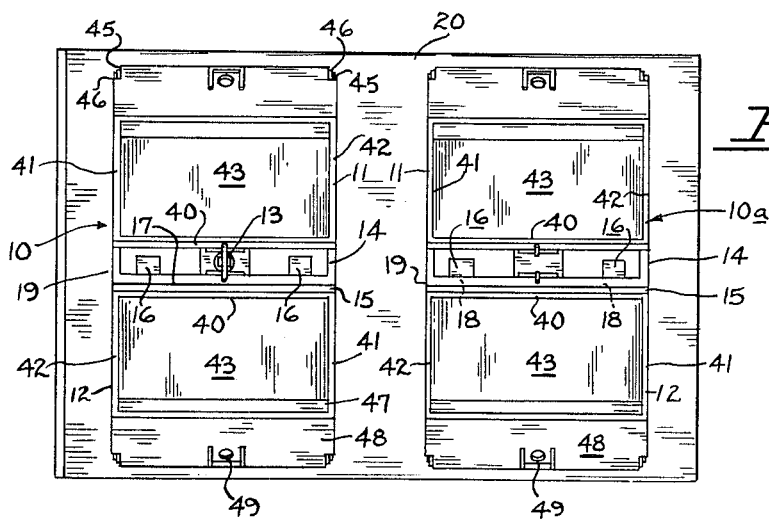

United States Patent Office 3,193,150
Patented July 6, 1965

3,193,150
PORTABLE DUMPING BIN
William E. Simas, Salinas, Calif., assignor to The Triangle Co., Salinas, Calif., a corporation of California
Filed Aug. 1, 1962, Ser. No. 213,911
10 Claims. (Cl. 222—166)

This invention relates to a portable dumping bin.

The invention has many uses, but one will serve as an example. In agriculture it makes practical and convenient the handling of fertilizers in bulk, rather than in bags, in the operation of moving fertilizer on trucks from a central depot to fertilizer spreaders in the fields. Bins embodying the invention are each provided with a pallet-like base that can be lifted by a fork-lift truck, whether full or empty, and put onto a truck. Each bin has an open upper end through which it may be filled with any desired fertilizer at a central storage place, either before or after the bin is put onto the truck. With a desired number of filled bins, the truck is driven into the field. There, power apparatus provided by this invention is employed to dump the contents of the bins over the side of the truck into the hoppers of fertilizer spreaders, the truck being driven from place to place and a bin dumped at any desired place. Thus, instead of the fertilizer spreaders having to be filled by hand shoveling or by emptying bags by the hundreds into them, they are filled in the field by power-dumping inexpensive bulk fertilizers, which the spreaders then apply to the field.

One object of the invention is to simplify the handling of bulk materials between a storage place and a dispensing place. In achieving this object, specific problems arise, such as how to economize in the number and type of bin-dumping power apparatus, how to provide a form of bin which is easily filled and easily dumped, how to control the rate of dumping of the bin, how to make sure that the bins will dump their contents far enough out beyond the truck bed so that the fertilizer (or other material) will not be spilled but will dump directly over the receptacles of the fertilizer distributor or other receptacle, and how to enable handling of the bins by fork-lift trucks. Achievement of solutions to each of these problems is also among the objects of the present invention.

Other objects and advantages of the invention will appear from the following description of a preferred form thereof in accordance with the requirements of the patent statute.

In the drawings:

FIG. 1 is a view in side elevation of a bin assembly embodying the principles of the invention. A pair of bins with their bases locked together is shown in solid lines in the upright, transport position, while in dotted lines are shown two extensions of the lift cylinder, parts being broken in order to avoid confusion, and the two corresponding positions of one bin as it is lifted, under constant control, to its highest dumping position, the bulk product being dumped into a hopper of a vehicle bin which is also indicated by broken lines.

FIG. 2 is a view in perspective of one of the bin assemblies of FIG. 1 in a dispensing or dumping position.

FIG. 3 is a fragmentary view in perspective of the upper portion of the assembly of FIG. 2, with the bin tilted still higher; the base is omitted from this view.

FIG. 4 is a fragmentary view in perspective of a portion of the base frame of one of the bin assemblies and showing the attachment thereto of the lift cylinder, only the lower portion of the cylinder being shown.

FIG. 5 is a top plan view of a truck bed or trailer bed on which four bins of the type of this invention are supported in pairs, with a lift cylinder in place between the bins of one of the pairs.

The invention provides bin assemblies 10. In the embodiment shown in the drawings, each bin assembly 10 comprises a pair of bins 11, 12 arranged to extend across a truck bed and to dump from opposite sides at each side thereof. One, two, or more of such assemblies comprise a group, and each group (or truck load of bins) requires only one power dumping device. This device is a lifting means able to dump or dispense from one bin at a time upon being properly connected to that bin. FIG. 1 shows a typical assembly 10 in which a pair of bins 11 and 12 are used in conjunction with one lift cylinder 13, and FIG. 5 illustrates the use of a plurality of pairs of bin assemblies 10 and 10a with one movable cylinder 13. There, the cylinder 13 is detachable from between the bins of the assembly 10 and movable to a position between the bins of the assembly 10a. It may be used for power dumping of either bin 11, 12 of the assembly where it is then located.

Each assembly 10 or 10a has a pair of base members 14, 15, each pair preferably being so made that arms 16 on the inner end 17 of a base member 15 will interlock in sockets 18 in the inner end 19 of a base member 14. The base members 14 are made interchangeable with each other, as are the base members 15. As shown in FIGS. 1 and 5, it is contemplated that two base members 14 and 15 will normally extend end-to-end across the width of a truck bed 20, from one side of the truck to the other. So that they can be handled by fork-lift trucks, each base member 14, 15 is provided with an outer end 21 having suitable entry openings 22 (see FIG. 2) for the forks of a fork-lift truck. Also, a crossbar 23 is provided at a convenient distance from the openings 22, to engage near the outboard end of the forks of the fork-lift truck so that the forks will have a bearing surface there and will not simply tip upwardly.

At the inner end of each base member 15 is a lift support means 24 enabling attachment of the releasable or detachable cylinder 13. The means 24 (see FIG. 4) may simply comprise a short column with an attachment yoke at its upper end in which a tongue on the lower end of the cylinder 13 may be secured. The other base member 14 need not have such a means 24, since the bases 14 and 15 are generally used in pairs.

Adjacent the outer end 21 of each base member 14, 15 a generally upright frame 30 is pivoted along a line parallel to the outer end 21 for limited movement between a normal vertical position (solid lines, FIG. 1) and a tilted or sloped position (broken lines, FIG. 1) where the upper end 31 of the frame 30 lies beyond the outer end 21. This may be accomplished by providing a rotatable or stationary axle 32 supported by the base 14 or 15 to which the frame member 30 is journaled or attached. The frame 30 may have two generally upright arms 33 and 34, and there may be a suitable reinforcing truss 35 for connecting the two arms 33 and 34 and making the frame 30 rigid. One or more of the side members of the base 14 or 15 may have stop means 36, 37 adapted to engage the frame side arms 33, 34 to prevent the frame 30 from moving beyond a certain position, as shown in FIG. 1. Thus, the movement of the frame 30 is limited to a desired angle.

Each frame 30 pivotally supports one bin member 11 or 12 at its upper end. Each bin 11, 12 may be shaped as shown having a generally vertical rear wall 40 adapted to lie adjacent the inner end 17 or 19 of its base 14 or 15, vertical side walls 41, 42, a generally horizontal bottom wall 43, a tilted or, if desired, vertical front wall 44 with recessed portions 45 for attachment by pivots 46 to the frame 30, an open upper end 47 for the reception of material from a much larger storage hopper or truck or any other device from which the fertilizer may be loaded or, if desired, shoveled, and a discharge outlet preferably comprising a slanting wall 48 with an outlet 49 of any suitable type. The outlet 49 is shown in the drawings as a cylindrical extension, adapted for guiding the fertilizer or bulk material to any desired location, but the outlet or chute may be any other type suitable for the use to which the device is to be put.

The bin 11 or 12 is attached only at the pivotal attachment 46 to the frame 30 but is made of suitable dimensions so that its lower end 43 normally, i.e, during transportation, rests on the base 14 or 15 so that load is taken off the pivot means 46 except during dispensing and dumping.

To an attachment point 50 adjacent the meeting of the rear and forward walls 43 and 44 a cable 51 or other suitable type of attachment is secured; from there the cable 51 goes beneath the bottom wall 43 to and beyond the rear wall 40. Preferably, a cylindrical bearing 52 is provided adjacent the meeting of the rear and bottom walls 40 and 43 to prevent wear of the cable 51 and of the bin. The cable 51 is of suitable length and has a hook 53 at its outer end for releasable attachment to one of two anchors 54, 55 both provided on each base 14.

The lifting means itself may comprise a hydraulic or pneumatic cylinder 13 having a suitable piston inside and a piston rod 56. On the outer end of the rod 56 is a rotatable sheave 57 or other device for engaging and guiding the cable 51. When any particular bin 11 or 12 has its cable 51 hooked to its appropriate securing means 54 or 55 (that is, the hook 54 or 55 lying on the opposite side of the cylinder 13 from the bin 11 or 12 to which the hook 53 of that cable 51 is attached) and its cable 51 is engaged on the sheave 57, then that particular bin 11 or 12 is tilted upon actuation of the cylinder 13 to extend the piston rod 56.

The hydraulic cylinder 13 is actuated by a pump 58, which may be portable or stationary and may be battery operated or operated by the power take-off of the truck carrying the bins or of the tractor or gasoline or electric other device being loaded from the bins. The cylinder 13 is made detachable, so that it can be used for more than one pair of bins. After the first bin has been dumped, its cable 51 is detached from the sheave 57 and the second member of the same pair can then be attached. Similarly, the entire lifting attachment 13 is movable by detaching its tongue and yoke connection from the base 14 of the assembly 10 and moving it to a similar attachment on the base 14 of an adjacent assembly 10a as in FIG. 5. The hydraulic motor 58, which has a flexible connection 59 to enable this attachment, is then operated in the same manner as before.

For operation, the bins 11, 12 may be loaded on the ground or at any desired spot and kept in storage at various places in a central area where various kinds of fertilizer are available, or each bin 11, 12 may be kept near an appropriate kind of fertilizer. The bin may be filled before or after it is placed on the truck bed, depending on which is more convenient for the occasion. In either event, the bin 11, 12 is placed onto the truck bed 20 by a fork-lift truck and is arranged with the outer end 21 adjacent the side edge of the truck bed 20 and the rear wall 40 of the bin 11 or 12 adjacent the center line of the truck bed 12. The bins are arranged that way in pairs or single, the number of singles or pairs depending on the length of the truck bed. The bins, after being filled, are ready for use and may be driven to any desired spot by the truck and then dumped by attaching the hook 53 of the cable 51 for that bin to its anchor 54 or 55 and to the sheave 57 and then actuating the cylinder 13. During lifting, the initial pull unbalances the frame member 30 sufficiently to move it to its outboard position, shown in broken lines in FIG. 1 and also shown in FIGS. 2 and 3, so that the discharge outlet 59 of the bin lies out beyond the side of the truck. Then further lifting accomplishes the pivoting of the bin around the frame into the dispensing position shown in the upper broken-line portion of FIG. 1 or in FIG. 3. Quite accurate control of the rate and location of the discharge is maintained at all times.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A portable dumping bin assembly for bulk materials, including, in combination,
    a stationary horizontal base having a pouring end,
    a generally upright rigid frame with a lower end pivotally supported by said base about an axis closely adjacent said pouring end, said frame having an upper end,
    stop means on said base for limiting the angular pivotal movement of said frame between a vertical position and a tilted position in which the upper end lies beyond said pouring end of said base,
    a bin having a bottom end normally resting on said base where said bin is in a non-pouring storage position and an upper end pivotally supported in restraint by the upper end of the frame along a line parallel to said axis and vertically above it when said bin is in its storage position, said bin having discharge means lying closely adjacent said line, the center of gravity of said bin during its storage position lying on the opposite side of said line from said pouring end and lying on the same side of said line as said pouring end when said bin is in its pouring position, and
    bin tilting means secured to said base for lifting said bin while moving it pivotally relative to said frame so as to cause said frame to move out to its tilted position, so that further lifting moves said bin to dump from its said discharge means.

2. The assembly of claim 1, wherein said bin tilting means includes a cable having one end anchored to said bin adjacent said frame and another end detachably secured to said base, and lift means detachably anchored to said base and having an extensible telescoping rod with cable guiding means on its outer end, whereby said cable may be engaged with said cable guiding means so that when said rod is extended, the frame is swung out and then the bin is lifted and tilted outwardly to dispense material through its said discharge means.

3. The assembly of claim 2 wherein said bin has a forward wall adjacent said pouring end, a rear wall at the opposite end of said frame, side walls, a bottom wall, an open upper end for filling, and a sloping portion connecting said open upper end to said forward wall and having a spout, said cable being anchored to said bin adjacent the juncture of said forward and bottom walls and extending beneath said bottom wall to said rear wall.

4. The assembly of claim 3 wherein said lift means comprises a hydraulic cylinder having a piston rod with a sheave on its outer end, said cable being engaged with said sheave.

5. The assembly of claim 1 wherein said base has means affording entry to the forks of a lift truck.

6. A portable dumping bin assembly for bulk materials, including, in combination,
    a pair of interlocking stationary horizontal bases each having an interlocking end and, distant therefrom, a pouring end,
    a pair of generally upright rigid frames each with a lower end pivotally supported by one said base about an axis closely adjacent said pouring end thereof, each said frame having an upper end,
    stop means on each said base for limiting the angular pivotal movement of its said frame between a vertical position and a tilted position in which the upper end lies beyond said pouring end of its said base, a pair of bins, each having a bottom end normally resting on said base where said bin is in a non-pouring storage position and an upper end pivotally supported in restraint by the upper end of one said frame along a line parallel to said axis and vertically above it when said bin is in its storage position, each said bin having discharge means lying closely adjacent said line, the center of gravity of each said bin during its storage position lying on the same side of said line as said interlocked ends and, during its pouring position, lying on the same side of said line as said pouring end, and bin tilting means secured to one said base for lifting each said bin while moving it pivotally relative to its said frame so as to cause said frame to move out to its tilted position, with further lifting moving that said bin to dump from its said discharge means.

7. The assembly of claim 6 wherein said bin tilting means comprises a cable anchored to each said bin adjacent said frame and detachably secured to a said base, and lift means anchored to one said base and having an extensible telescoping rod with cable guiding means on its outer end, whereby said cables may be successively engaged with said cable guiding means, one at a time, so that when said rod is extended, the frame supporting the said bin with the attached cable is lifted and tilted outwardly and then said bin is tilted to dump material therefrom through its said discharge means.

8. The assembly of claim 6 wherein the pouring end of each said base has means affording entry to the forks of a lift truck.

9. A portable dumping bin assembly for bulk materials, including, in combination, a pair of interlocking stationary horizontal bases each having an interlocking end and a pouring end, a pair of generally upright rigid frames each with a lower end pivotally supported by one said base about an axis closely adjacent said pouring end thereof, each said frame having an upper end, stop means on each said base for limiting the angular pivotal movement of its said frame between a vertical position and a tilted position in which the upper end lies beyond said pouring end of its said base, a pair of bins, each having a bottom wall normally resting on said base where said bin is in a non-pouring storage position, an open upper end for filling pivotally supported in restraint by the upper end of the frame along a line parallel to said axis and vertically above it when said bin is in its storage position, a rear wall adjacent said interlocking end of its said base, a forward wall adjacent said pouring end of its said base, side walls, and a sloping wall connecting said forward wall and said upper open end and having a dispensing spout adjacent said line, a cable anchored to each said bin adjacent the juncture of said forward and bottom walls and extending beneath said bottom wall to said rear wall and therebeyond and detachably secured to a said base, and lift means detachably anchored to one of said bases and having an extensible telescoping rod with cable guiding means on its outer end, whereby said cables may be separately engaged with said cable guiding means so that when said rod is extended, the frame supporting the said bin with the attached cable is tilted outwardly and then said bin is tilted to dump material therefrom through its said spout.

10. The assembly of claim 9 wherein said lift means comprises a hydraulic lift cylinder releasably anchored to one of said bases and having an extensible rod with a sheave on its outer end, whereby said cables may be engaged at separate times with said sheave.

References Cited by the Examiner

UNITED STATES PATENTS

| 664,991 | 1/01 | Caswell | 222—173 X |
| 668,927 | 2/01 | McKnight | 105—270 |
| 2,760,815 | 8/56 | La Borde | 298—8 |

FOREIGN PATENTS

| 231,745 | 4/25 | Great Britain. |

RAPHAEL M. LUPO, *Primary Examiner.*

SAMUEL F. COLEMAN, LOUIS J. DEMBO, *Examiners.*